United States Patent Office 3,153,659
Patented Oct. 20, 1964

3,153,659
CAFFEOYL GLYCERIDES
Harold G. C. King, Harpenden, England, assignor to the United States of America as represented by the Secretary of Agriculture
No Drawing. Filed July 30, 1963, Ser. No. 298,807
4 Claims. (Cl. 260—410.8)

A nonexclusive irrevocable, royalty-free license in the invention herein described, throughout the world for all purposes of the United States Government, with the power to grant sublicenses for such purposes, is hereby granted to the Government of the United States of America.

This invention relates to improvements in the preparation and use of compounds, having antioxidant activity, for the stabilization of foodstuff, feeding stuffs, fats, and oils against undesirable oxidative changes. By incorporating these compounds in foodstuffs, feeding stuffs, fats, and oils such deleterious changes are effectively inhibited and the quality of these materials is thereby maintained. The invention consists in novel glycerides having antioxidant activity, said glycerides comprising glycerol esterified by caffeic acid. The invention further consists in a glyceride having antioxidant activity comprising glycerol esterified by caffeic acid and a saturated fatty acid. Thus, mono- di- or tri-caffeoyl glycerides may be prepared or, as an example of the mixed glycerides which may be prepared, dicaffeoyl mono-palmitoyl glyceride. Other saturated fatty acids may be used in conjunction with caffeic acid to form corresponding mixed glycerides.

The antioxidant compounds have the advantage of being synthesized from substances of widespread natural occurrence in foodstuffs (although not necessarily in combination with either glycerol or caffeic acid respectively as a second component), and combine some of the solubility characteristics of the components from which they are derived.

Thus, while glycerol itself has no antioxidant activity, it is readily soluble in aqueous media and polar solvents generally. Caffeic acid alone has antioxidant properties, but it is only slightly soluble in aqueous media. Saturated fatty acids, especially of long chain length, are soluble in nonpolar solvents. When a molecule of caffeic acid is esterified to glycerol at a terminal hydroxyl group of the latter the unesterified hydroxyl groups of glycerol, with the phenolic hydroxyl groups of caffeic acid impart a substantial measure of solubility to the compound in polar solvents. Further esterification of the remaining glycerol hydroxyl groups with caffeic acid alone or with caffeic acid plus a saturated fatty acid renders the glycerides so formed more soluble in nonpolar solvents, especially where the fatty acid is of considerable chain length. Thus the new caffeoyl glycerides provide antioxidants which may be made to be soluble in aqueous or nonaqueous media by selective esterification of the component acid or acids according to the particular solubility requirements.

METHODS OF PREPARATION (1) Synthesis of the caffeoyl glycerides is achieved by the general method of condensing dicarbomethoxy caffeoyl chloride with anhydrous glycerol in the presence of anhydrous quinoline, and anhydrous chloroform as solvent. The quantities of reactants are so chosen to give a slight excess of the acid chloride to glycerol over and above the required stoichiometric ratio.

(2) Alternatively, dicarbomethoxy caffeoyl chloride is condensed with a monoglyceride whose esterified group is a saturated fatty acid, e.g., with monopalmitin.

(3) In the particular case of mono-caffeoyl glycerol the condensation is allowed to take place between di-carbomethoxy caffeoyl chloride and anhydrous isopropyl-idene glycerol (acetone glycerol) with subsequent removal of the isopropylidene group by hydrolysis with concentrated hydrochloric acid in diethyl ether solution.

The dicarbomethoxy derivatives are isolated by washing the reaction mixtures with dilute mineral acid until the quinoline is removed, distilling the chloroform, and purifying the residues from suitable mixtures of acetone and water.

By these methods mono-(dicarbomethoxy caffeoyl) glycerol, melting 63°–74° C. was prepared by method (3). Di-(dicarbomethoxy caffeoyl) mono palmitin, melting 55°–60° C. was prepared by method (2). Tri(dicarbomethoxy caffeoyl) glycerol, melting 55°–67° C. was prepared by method (1).

Removal of the protecting dicarbomethoxy groups is achieved in every case by hydrolysis at room temperature with sodium hydroxide or ammonium hydroxide in the presence of pyridine, with acetone as solvent, allowing two molecules of alkali for each dicarbomethoxy group, and acidifying with mineral acid after hydrolysis. Dicaffeoyl and tricaffeoyl esters are insoluble in the acidified reaction mixture and are filtered off. Mono-caffeoyl glycerol is soluble in the acidified reaction mixture and is isolated by prolonged extraction with large volumes of ether.

The novel compounds of this invention has the following formulas:

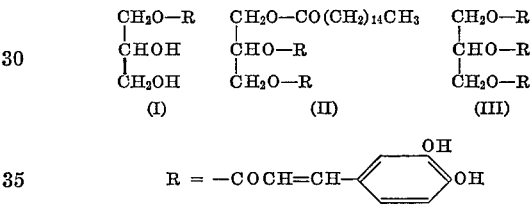

By the above methods were thus prepared:

Example 1.—Mono-caffeoyl glycerol, somewhat hygroscopic, M.P. 143° C.; caffeic acid liberated on alkaline hydrolysis: 70.7%; theoretical, 70.9%; soluble in water, ethy alcohol and acetone to the extent of at least 20 percent at room temperature insoluble in ether and nonpolar solvents.

Example 2.—Dicaffeoyl mono palmitin, waxy, melting 35°–40° C.; caffeic acid liberated on alkaline hydrolysis, 40.0%; theoretical, 55.1%; soluble in ethyl alcohol, acetone, ether and chloroform to the extent of at least 20 percent at room temperature, insoluble in water.

Example 3.—Tricaffeoyl glycerol, hydroscopic, M.P. 105°–110° (4); caffeic acid liberated on alkaline hydrolysis, 90.0%; theoretical, 93.7%; soluble in ethyl alcohol and acetone to the extent of at least 20 percent at room temperature, soluble in ether to the extent of 5 percent at room temperature, insoluble in water.

The degree of antioxidant activity of the glycerides mentioned particularly above, measured in arbitrary units by the method of Daniels and Martin described in Nature 1961, 191, 1302 (using 0.5 mg. caffeoyl glyceride per 200 mg. oat oil substrate) is given in the following table. In this table the range of activities of different preparations of the new antioxidants are compared with methyl caffeate, the simplest caffeoyl ester, and propyl gallate, an established antioxidant.

| Antioxidant: | Actvity |
| --- | --- |
| Mono caffeoyl glycerol | 36–47 |
| Di caffeoyl mono palmitin | 29–32 |
| Tri caffeoyl glycerol | 38–41 |
| Methyl caffeate | 55 |
| Propyl gallate | 50–60 |

The solubility properties of the new caffeoyl glycerides, tailored for use with polar or nonpolar solvents may provide an improved method of manufacture of foodstuffs by contributing to improved efficiency in the distribution of the antioxidants through the mass of the foodstuff to which they are added. Appropriate polar, or less polar, solvents act as convenient vehicles for such distribution.

I claim:
1. Glyceride caffeic acid esters selected from the group consisting of: 1-mono-caffeoyl glycerol, dicaffeoyl-monopalmitin, and tricaffeoyl glycerol.
2. The compound 1-mono-caffeoyl glycerol.
3. The compound dicaffeoyl monopalmitin.
4. The compound tricaffeoyl glycerol.

No references cited.